United States Patent
Yonemura et al.

(10) Patent No.: US 9,486,797 B2
(45) Date of Patent: Nov. 8, 2016

(54) METHOD FOR REGENERATING COS HYDROLYSIS CATALYST

(71) Applicant: MITSUBISHI HEAVY INDUSTRIES, LTD., Tokyo (JP)

(72) Inventors: Masanao Yonemura, Tokyo (JP); Akihiro Sawata, Tokyo (JP); Yukio Tanaka, Tokyo (JP); Hiroshi Yoshioka, Tokyo (JP); Toshinobu Yasutake, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/897,104

(22) PCT Filed: Nov. 10, 2014

(86) PCT No.: PCT/JP2014/079756
§ 371 (c)(1),
(2) Date: Dec. 9, 2015

(87) PCT Pub. No.: WO2015/098319
PCT Pub. Date: Jul. 2, 2015

(65) Prior Publication Data
US 2016/0136636 A1 May 19, 2016

(30) Foreign Application Priority Data
Dec. 27, 2013 (JP) ................... 2013-273465

(51) Int. Cl.
| | |
|---|---|
| *B01J 38/68* | (2006.01) |
| *B01J 38/64* | (2006.01) |
| *B01J 23/92* | (2006.01) |
| *B01J 38/02* | (2006.01) |
| *B01J 21/06* | (2006.01) |
| *B01J 21/20* | (2006.01) |
| *B01J 23/02* | (2006.01) |
| *B01J 38/48* | (2006.01) |

(52) U.S. Cl.
CPC .............. *B01J 38/64* (2013.01); *B01J 21/063* (2013.01); *B01J 21/20* (2013.01); *B01J 23/02* (2013.01); *B01J 23/92* (2013.01); *B01J 38/02* (2013.01); *B01J 38/485* (2013.01); *B01J 2523/00* (2013.01); *B01J 2523/25* (2013.01); *B01J 2523/31* (2013.01); *B01J 2523/47* (2013.01)

(58) Field of Classification Search
CPC ....................................... B01J 38/68
USPC ............................................. 502/24
See application file for complete search history.

(56) References Cited

U.S. PATENT DOCUMENTS

| | | | |
|---|---|---|---|
| 4,485,189 | A | 11/1984 | Dupin |
| 4,511,668 | A | 4/1985 | Nozue et al. |
| 5,942,201 | A | 8/1999 | Hartmann |

FOREIGN PATENT DOCUMENTS

| | | |
|---|---|---|
| JP | 57-180433 A | 5/1982 |
| JP | 6-218230 A | 8/1994 |
| JP | 2001-162174 A | 6/2001 |
| JP | 2002-102716 A | 4/2002 |
| JP | 2004-75712 A | 3/2004 |
| JP | 2006-143959 A | 6/2006 |
| WO | 2013/125437 A1 | 8/2013 |

OTHER PUBLICATIONS

International Search Report dated Feb. 3, 2015, issued in counterpart Application No. PCT/JP2014/079756, w/English translation (4 pages).
Mitten Opinion dated Feb. 3, 2015, issued in counterpart Application No. PCT/JP2014/079756, w/English ranslation (6 pages).
Hongyan Wang, et al., "Reactivation of CoNiAl Calcined Hydrotalicite-like Compounds for Hydrolysis of Carbonyl Sulfide", I&EC Research, Industrial & Engineering Chemistry Research, 2013, vol. 52, pp. 9331-9336.
Database WPI Week 200230 Thomson Scientific, London, GB; AN2002-242440, XP002758595 and CN1329941A, Jan. 9, 2002.
Paris D. N. Svoronos, et al. "Carbonyl Sulfide: A Review of Its Chemistry and Properties", Ind. Eng. Chem. Res., 2002, vol. 41, pp. 5321-5336.
Extended (Supplementary) European Search Report (EESR) dated Jun. 23, 2016, issued in counterpart European Patent Application No. 14 87 5785.9 (11 pages).
Office Action dated Jul. 29, 2016, issued in counterpart Chinese Patent Application No. 201480029715.8, with English translation. (14 pages).
J. Li-Hong, et al. "Study on Regeneration of the Deactivated Catalyst Ni/Ai2O3-MxOy Used for Hydrogenation of Gum Rosin", Chemistry and Industry of Forest Products, vol. 29, Oct. 2009, pp. 159-164.
Office Action dated Aug. 23, 2016, issued in counterpart Australian Patent Application No. 2014371677. (4 pages).

*Primary Examiner* — Edward Johnson
(74) *Attorney, Agent, or Firm* — Westerman, Hattori, Daniels & Adrian, LLP

(57) ABSTRACT

The method for regenerating a carbonyl sulfide (COS) hydrolysis catalyst according to the present invention is a method for regenerating a Ba/TiO$_2$ based carbonyl sulfide (COS) hydrolysis catalyst by hydrolyzing COS which is contained in a gas obtained by gasifying a carbon raw material, wherein a spent COS hydrolysis catalyst is washed with water, dried, immersed in an aqueous solution of a barium salt for a prescribed amount of time, dried, and calcined so as to re-support the active component on the surface of the COS hydrolysis catalyst, thus enabling the regeneration of the COS hydrolysis catalyst.

7 Claims, 1 Drawing Sheet

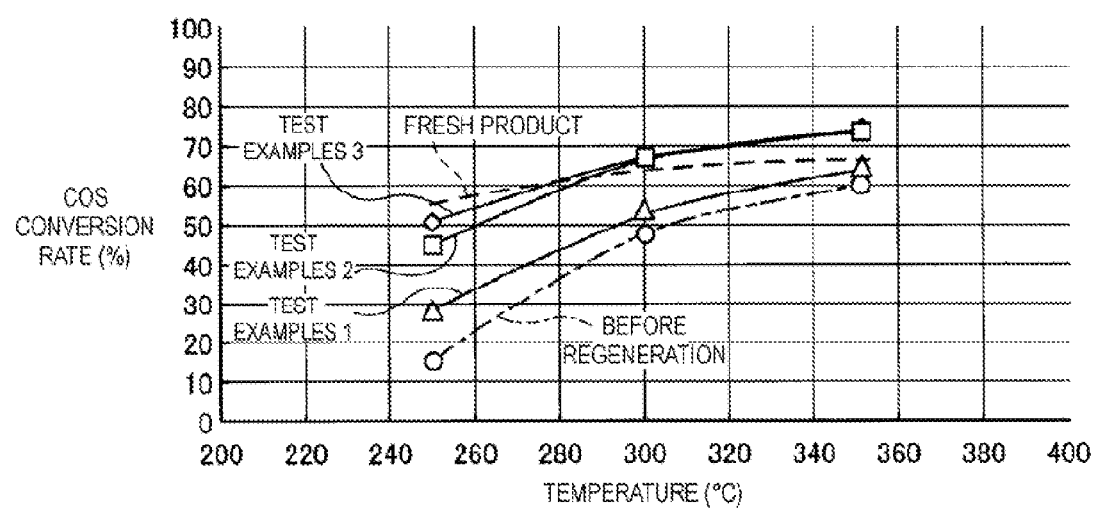

METHOD FOR REGENERATING COS HYDROLYSIS CATALYST

TECHNICAL FIELD

The present invention relates to a method for regenerating a COS hydrolysis catalyst.

BACKGROUND ART

In recent years, there has been a demand for the effective utilization of low-quality fuels such as coal or heavy oil from the perspective of diversification so as to actively use low-quality fossil fuels in addition to high-quality fossil fuels. In addition, integrated coal gasification combined cycle (IGCC), in which gas turbines using gas fuel and steam turbines are used in combination, and power generation by means of introducing hydrocarbon gas into fuel cells are also becoming widespread from the perspective of improving power generation efficiency in the field of thermal power generation. Therefore, there is research and development underway to gasify low-quality fuels and use them for such power generation.

Incidentally, a low-quality fuel typically contains a large amount of sulfur compounds, and when a gas obtained by gasifying this fuel is combusted directly, the sulfur compounds are discharged from the chimney into the atmosphere as sulfur oxides, which become a source of environmental pollution such as acid rain. Therefore, in ordinary thermal power generation, a method of installing an exhaust gas desulfurizer is installed on the back stream side of the boiler so as to remove sulfur compounds as gypsum, for example, has been put into practical application. However, in combined cycle power generation, the inlet temperature of a gas turbine is higher than the boiler temperature in ordinary thermal power generation, so the corrosion of the material is substantial. Therefore, it is necessary to protect the material by removing various impurities such as sulfur compounds on the front stream side rather than the back stream side of the gas turbine, so the aforementioned exhaust gas desulfurizer cannot be applied. For example, when installing a fuel cell power generator, it is essential to secure power generation efficiency and durability by protecting the material, and various impurities must be similarly removed on the front stream side of the fuel cell.

A so-called wet gas purification process, wherein water-soluble components are removed with a water scrubber and hydrogen sulfide ($H_2S$) is removed with an aqueous amine solution, has been put into practical application as such a method for removing impurities. However, although hydrogen sulfide ($H_2S$) can be removed with an aqueous amine solution, carbonyl sulfide (COS) cannot be removed. Therefore, a hydrolysis reaction expressed by formula (1) is performed using a COS hydrolysis catalyst so as to accelerate a reaction for converting the substance into the form of hydrogen sulfide ($H_2S$) which can be removed with an aqueous amine solution.

$$COS + H_2O \rightarrow H_2S + CO_2 \quad (1)$$

Here, examples of known COS hydrolysis catalysts include catalysts containing titania, catalysts containing alumina, a group IV metal and barium, and catalysts containing an alkali metal, chromium oxide, and alumina (Patent Document 1).

Incidentally, in integrated coal gasification combined cycle (IGCC), there is a problem in that when a COS hydrolysis catalyst is used continuously for COS in a gasified gas, so-called catalyst poisoning occurs, wherein the dust content (for example, sulfides) in the gasified gas covers the surface of the COS hydrolysis catalyst, which causes a decrease in catalyst performance.

The catalyst with reduced performance as a result of poisoning is reused by means of regeneration treatment.

A method of performing heat treatment on as catalyst and then re-supporting sodium carbonate, for example, has been proposed as such a catalyst regeneration method (Patent Document 2).

CITATION LIST

Patent Literature(s)

Patent Document 1: Japanese Unexamined Patent Application Publication No. 2004-75712A Patent Document 2: Japanese Unexamined Patent Application Publication No. 2001-162174A

SUMMARY OF INVENTION

Technical Problem

The method for regenerating a COS hydrolysis catalyst according to the conventional art is an impregnation regeneration method using an alkali metal as a chemical, and the impregnation of the alkali metal does not necessarily result in the recovery of performance. Moreover, impregnation treatment is performed with material in a pellet shape, which is problematic in that the pellets make contact with one another and are pulverized at the time of regeneration.

Therefore, there is a demand for the emergence of a method for regenerating a COS hydrolysis catalyst with a high recovery rate in a state in which the catalyst shape is maintained.

In light of the problems described above, an object of the present invention is to provide a method for regenerating a COS hydrolysis catalyst with a high recovery rate in a state in which the catalyst shape is maintained.

Solution to Problem

In order to solve the problem described above, a first invention of the present invention is a method for regenerating a barium oxide-based carbonyl sulfide (COS) hydrolysis catalyst by hydrolyzing COS which is contained in a gas obtained by gasifying a carbon raw material, wherein a spent COS hydrolysis catalyst is immersed in an aqueous solution of a barium salt for a prescribed amount of time, dried, and then calcined.

A second invention is the method for regenerating a COS hydrolysis catalyst according to the first invention, wherein dust removal is performed prior to immersion.

A third invention is the method for regenerating a COS hydrolysis catalyst according to the first or second invention, wherein drying is performed after water washing prior to immersion.

A fourth invention is the method for regenerating a COS hydrolysis catalyst according to one of the first through third inventions, wherein the temperature of calcination is at least 200° C.

Advantageous Effects of Invention

With the present invention, the active component is re-supported, so it is possible to reuse a spent COS hydrolysis catalyst.

BRIEF DESCRIPTION OF DRAWING(S)

FIG. 1 illustrates the relationship between the change in temperature of a COS hydrolysis catalyst and the COS conversion rate.

DESCRIPTION OF EMBODIMENTS

The following is a detailed description of preferred embodiments with reference to the attached drawings. Note that the invention is not limited by the embodiments, and when a plurality of embodiments are present, the invention is intended to include a configuration combining these embodiments.

Embodiment 1

The method for regenerating a COS hydrolysis catalyst according to Embodiment 1 will be described.

The method for regenerating a COS hydrolysis catalyst according to Embodiment 1 is a method for regenerating a barium oxide (for example, $Ba/TiO_2$) based carbonyl sulfide (COS) hydrolysis catalyst by hydrolyzing COS which is contained in a gas obtained by gasifying a carbon raw material such as coal, for example, wherein a spent COS hydrolysis catalyst is washed with water, dried, immersed in an aqueous solution of a barium salt for a prescribed amount of time, dried, and then calcined.

With the present embodiment, by re-supporting the active component in a spent, degraded COS hydrolysis catalyst, it is possible to regenerate the catalyst. In addition, since the catalyst is a honeycomb-type catalyst, it is possible to regenerate the COS hydrolysis catalyst with a high recovery rate in a state in which the catalyst shape is maintained.

Here, an example of the catalyst of the present invention is a honeycomb-type $TiO_2$ catalyst supporting barium (Ba). In addition, $TiO_2$ was given as an example of a carrier, but a carrier of $Al_2O_3$ alone or a carrier of a complex oxide of $Al_2O_3$ and $TiO_2$ may also be used.

The procedure of the method for regenerating a catalyst according to Embodiment 1 will be described hereinafter.

(1) First, a honeycomb-type $BaTiO_2$ based COS hydrolysis catalyst with which a COS conversion device of a coal gasification power plant has been filled is extracted.

(2) The dust content adhering to the extracted $Ba/TiO_2$ based COS hydrolysis catalyst is removed by a gas spraying device such as an air blower.

(3) Next, a prescribed amount of washing water is placed in an immersion vessel, and the catalyst is immersed in the water in the vessel. Here, the amount of the water washing solution is at least an amount which allows the COS hydrolysis catalyst to be sufficiently hidden. More preferably, the amount is such that the volume ratio of washing water/COS hydrolysis catalyst is at least 3.

The water washing may be performed at room temperature or under heat. Ion-exchanged water, for example, may be used as the washing water. Water washing may also be omitted.

(4) The substance is left and water-washed for approximately 15 to 60 minutes, for example, in this immersed state.

(5) After the substance is taken out from the washing water, the excess liquid in the COS hydrolysis catalyst is removed, and the substance is then dried.

The drying may be performed at room temperature or under heat. Here, in the case of heat drying, the temperature is preferably from 80° C. to 200° C. and particularly preferably from 110° C. to 150° C.

(6) After the substance is dried and cooled to room temperature, the catalyst is then immersed in a barium acetate aqueous solution prepared in a separate vessel. Here, the amount of the barium acetate aqueous solution is at least an amount which allows the COS hydrolysis catalyst to be sufficiently hidden. More preferably, the amount is such that the volume ratio of the barium acetate aqueous solution/COS hydrolysis catalyst is at least 3.

(7) The substance is left to stand for a prescribed amount of time, for example, in this immersed state. The immersion conditions are such that the substance is left to stand for 0.5 to 120 minutes and more preferably from 1 to 10 minutes.

Here, the barium acetate concentration is from 0.1 to 30 wt. % and preferably from 1 to 10 wt. %.

In addition, barium nitrate or the like, for example, may also be used as a barium source in addition to barium acetate.

(8) After the substance is immersed in the barium acetate aqueous solution, it is taken out and dried after the excess liquid in the catalyst is removed.

This drying may be performed by means of natural drying or heat drying. Here, in the case of heat drying, the temperature is preferably from 80° C. to 200° C. and particularly preferably from 110° C. to 150° C.

(9) The dried COS hydrolysis catalyst is calcined.

The calcination temperature of calcination treatment is at least 200° C., and the calcination atmosphere is atmospheric air.

By performing chemical washing with an aqueous solution of a barium salt in this way, it is possible to re-support the active component in the COS hydrolysis catalyst and to reuse the catalyst.

Here, the dust removal by means of air blowing in step (2) can be omitted depending on the amount of dust adhering to the catalyst.

Here, the water washing in step (3) may be omitted depending on the amount of dust adhering to the catalyst.

Embodiment 2

The method for regenerating a COS hydrolysis catalyst according to Embodiment 2 will be described.

In the method for regenerating a COS hydrolysis catalyst according to Embodiment 2, pretreatment may be performed before the active component in the aqueous solution of a barium salt in Embodiment 1 is re-supported.

This pretreatment is performed by 1) immersing the substance in an acid solution, 2) treating the substance with an alkali solution and then neutralizing the substance with an acid, or 3) treating the substance with an acid solution and then neutralizing the substance with an alkali.

Here, as the acid solution in acid treatment, sulfuric acid ($H_2SO_4$), hydrochloric acid (HCl), nitric acid ($HNO_3$), or the like with a concentration of at least 0.1 N and approximately 1 N can be used.

In this chemical treatment, when the chemical solution is heated (for example, 60 to 80° C.), the removal efficiency of adhering sulfides or the like improves.

As the alkali solution in alkali treatment, sodium hydroxide (NaOH), ammonia water ($NH_4OH$), sodium carbonate ($Na_2CO_3$), or the like with a concentration of at least 0.1 N and approximately 1 N can be used.

In this chemical treatment, when the chemical solution is heated for example, 60 to 80° C.), the removal efficiency of adhering sulfides or the like improves.

After chemical washing, the immersed COS hydrolysis catalyst is then immersed in a chemical (acid solution or alkali solution) prepared in a vessel and subjected to chemical washing. Here, the amount of the water washing solution is at least an amount which allows the COS hydrolysis catalyst to be sufficiently hidden. More preferably, the amount is such that the volume ratio of the chemical (acid or alkali)/COS hydrolysis catalyst is at least 3.

The substance is left and chemically treated for approximately 15 to 60 minutes, for example, in this immersed state.

After this chemical washing, the immersed COS hydrolysis catalyst is then immersed and water-washed in water (for example, ion-exchanged water) prepared in a separate vessel. Here, the amount of washing water is at least an amount which allows the COS hydrolysis catalyst to be sufficiently hidden. More preferably, the amount is such that the volume ratio of washing water/COS hydrolysis catalyst is at least 3.

The substance is left and water-washed for approximately 15 to 60 minutes, for example, in this immersed state.

After water washing, the COS hydrolysis catalyst is taken out and dried after excess liquid in the catalyst is removed.

Drying may be performed by means of natural drying or heat drying. In addition, the substance may also be calcined.

After pretreatment using this chemical, the active component is re-supported using the aqueous solution of a barium salt in Embodiment 1.

By performing chemical washing with an acid or an alkali before re-supporting the active component in this way, it becomes possible to remove poisoning substances adhering to the COS hydrolysis catalyst, and re-supporting the active component in a fresh state makes it possible to reuse the substance.

Test Examples

Next, test examples illustrating the effect of the present invention will be described, but the present invention is not limited to these test examples.

Test Example 1 is an example in which a spent COS hydrolysis catalyst was immersed in a barium acetate aqueous solution and impregnated so that the barium oxide (BaO) content was 0.9 wt. %.

Test Example 2 is an example in which a spent COS hydrolysis catalyst was immersed in a barium acetate aqueous solution and impregnated so that the barium oxide (BaO) content was 1.8 wt. %.

Test Example 3 is an example in which a spent COS hydrolysis catalyst was immersed in a barium acetate aqueous solution and impregnated so that the barium oxide (BaO) content was 3.6 wt. %.

The COS hydrolysis catalyst used in these tests is a $Ba/TiO_2$ based honeycomb-type COS hydrolysis catalyst.

FIG. 1 illustrates the relationship between the change in temperature of a COS hydrolysis catalyst and the COS conversion rate.

Using the regenerated COS hydrolysis catalyst of Test Example 1, 2, and 3, the COS conversion rates at catalyst treatment temperatures (250° C., 300° C., and 350° C.) were measured and shown in FIG. 1.

As illustrated in FIG. 1, it was confirmed that the COS conversion rate was consistently higher than the catalyst prior to regeneration in Test Examples 2 and 3 (products with a barium oxide content of 1.8 wt. % and 3.6 wt. %).

In addition, it was confirmed that the COS conversion rate was slightly higher than the catalyst prior to regeneration in Test Example 1 (product with a barium oxide content of 0.9 wt. %).

In particular, it was confirmed that the product of Test Example 3 has a higher COS conversion rate than as fresh catalyst from a temperature range exceeding approximately 280° C.

The chemical cost becomes expensive when the amount of the re-supported active component in the re-supported barium oxide exceeds 4.0 wt. % in terms of barium oxide content, so the content is preferably at most 4.0 wt. % in terms of barium oxide content. In addition, the performance diminished slightly in the product of Test Example 1 having a content of 0.9 wt. % in terms of barium oxide content, so the supported amount is preferably within a range of 1.0 wt. % to 4.0 wt. % in terms of barium oxide content.

The invention claimed is:

1. A method for regenerating a barium oxide-based carbonyl sulfide (COS) hydrolysis catalyst by hydrolyzing COS which is contained in a gas obtained by gasifying a carbon raw material, wherein a spent COS hydrolysis catalyst is immersed in an aqueous solution of a barium salt for a prescribed amount of time, dried, and then calcined.

2. The method for regenerating a carbonyl sulfide (COS) hydrolysis catalyst according to claim 1, wherein dust removal is performed prior to immersion.

3. The method for regenerating a carbonyl sulfide (COS) hydrolysis catalyst according to claim 1, wherein drying is performed after water washing prior to immersion.

4. The method for regenerating a carbonyl sulfide (COS) hydrolysis catalyst according to claim 1, wherein a temperature of the calcination is at least 200° C.

5. The method for regenerating a carbonyl sulfide (COS) hydrolysis catalyst according to claim 2, wherein drying is performed after water washing prior to immersion.

6. The method for regenerating a carbonyl sulfide (COS) hydrolysis catalyst according to claim 2, wherein a temperature of the calcination is at least 200° C.

7. The method for regenerating a carbonyl sulfide (COS) hydrolysis catalyst according to claim 3, wherein a temperature of the calcination is at least 200° C.

* * * * *